United States Patent
Bonicatto (10) Patent No.: US 9,306,736 B1
(45) Date of Patent: Apr. 5, 2016

(54) POWER-LINE COMMUNICATIONS WITH COMMUNICATION CHANNEL TO AND/OR FROM ENDPOINT CIRCUITS WITH AUTHENTICATION METHODOLOGY

(71) Applicant: Landis+Gyr Technologies, LLC, Pequot Lakes, MN (US)

(72) Inventor: Damian Bonicatto, Pequot Lakes, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

(21) Appl. No.: 14/683,298

(22) Filed: Apr. 10, 2015

Related U.S. Application Data (63) Continuation of application No. 14/031,936, filed on Sep. 19, 2013, now Pat. No. 9,009,467, which is a continuation of application No. 12/894,438, filed on Sep. 30, 2010, now abandoned.

(51) Int. Cl.
| | |
|---|---|
| *H04L 29/06* | (2006.01) |
| *H04L 9/08* | (2006.01) |
| *H04B 3/54* | (2006.01) |
| *H04L 1/00* | (2006.01) |

(52) U.S. Cl.
CPC .............. *H04L 9/0819* (2013.01); *H04B 3/542* (2013.01); *H04L 1/0046* (2013.01); *H04L 2209/24* (2013.01)

(58) Field of Classification Search
CPC .................................... H04L 9/28; H04L 9/32
USPC ................................................. 713/162, 170
See application file for complete search history.

(56) References Cited

U.S. PATENT DOCUMENTS

| | | | |
|---|---|---|---|
| 5,477,216 A | 12/1995 | Lee et al. | |
| 5,581,229 A | 12/1996 | Hunt | |
| 6,154,488 A | 11/2000 | Hunt | |
| 6,170,744 B1 * | 1/2001 | Lee et al. | 235/380 |
| 6,177,884 B1 | 1/2001 | Hunt et al. | |
| 6,529,883 B1 | 3/2003 | Yee et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |

(Continued)

OTHER PUBLICATIONS

Zhao, "High performance optical encryption based on computational ghost imaging with QR code and compressive sensing technique", May 11, 2015, Optics Communication, p. 90-95.*

*Primary Examiner* — Thanhnga B Truong
*Assistant Examiner* — Gregory Lane
(74) *Attorney, Agent, or Firm* — Crawford Maunu PLLC (57) ABSTRACT

In a power-line communication system, a data processing electronic circuitry can receive a plurality of symbols from a plurality of endpoint circuits and over a plurality of communications channels on power lines in a power-line communication system. A first symbol of the plurality of symbols can be decrypted using a first decryption key that is assigned to a first endpoint circuit. From the first decryption, a first measure of error is computed that includes a first bit error rate. The first symbol is decrypted using a second decryption key that is assigned to a second endpoint circuit. From the second decryption, a second measure of error is computed that includes a second bit error rate. The first and second bit error rates are compared to a threshold error measure to determine validity.

15 Claims, 5 Drawing Sheets

(56) References Cited

U.S. PATENT DOCUMENTS

| | | |
|---|---|---|
| 7,209,840 B2 | 4/2007 | Petite et al. |
| 7,224,740 B2 | 5/2007 | Hunt |
| 7,236,765 B2 | 6/2007 | Bonicatto et al. |
| 7,346,463 B2 | 3/2008 | Petite et al. |
| 7,432,824 B2 | 10/2008 | Flen et al. |
| 7,443,313 B2 | 10/2008 | Davis et al. |
| 7,468,661 B2 | 12/2008 | Petite et al. |
| 7,706,320 B2 | 4/2010 | Davis et al. |
| 7,738,999 B2 | 6/2010 | Petite |
| 7,742,393 B2 | 6/2010 | Bonicatto et al. |
| 7,774,530 B2 | 8/2010 | Haug et al. |
| 7,791,468 B2 | 9/2010 | Bonicatto et al. |
| 7,877,218 B2 | 1/2011 | Bonicatto et al. |
| 7,978,059 B2 | 7/2011 | Petite et al. |
| 8,144,816 B2 | 3/2012 | Bonicatto et al. |
| 8,144,820 B2 | 3/2012 | Bonicatto |
| 8,194,789 B2 | 6/2012 | Wolter et al. |
| 8,238,263 B2 | 8/2012 | Kohout et al. |
| 2003/0103470 A1* | 6/2003 | Yafuso .......................... 370/282 |
| 2004/0107398 A1 | 6/2004 | Johnson |
| 2005/0235154 A1 | 10/2005 | Serret-Avila |
| 2006/0075229 A1* | 4/2006 | Marek ........................... 713/168 |
| 2007/0189302 A1 | 8/2007 | Lee et al. |
| 2008/0304595 A1 | 12/2008 | Haug et al. |
| 2009/0137264 A1 | 5/2009 | Matsumoto |
| 2010/0021003 A1 | 1/2010 | Baum et al. |
| 2010/0115286 A1 | 5/2010 | Hawkes et al. |
| 2010/0153787 A1 | 6/2010 | Beattie et al. |
| 2010/0241753 A1* | 9/2010 | Garbajs et al. ................ 709/227 |
| 2011/0096814 A1* | 4/2011 | Wu et al. ....................... 375/219 |
| 2011/0121952 A1 | 5/2011 | Bonicatto et al. |
| 2011/0176598 A1 | 7/2011 | Kohout et al. |
| 2011/0218686 A1 | 9/2011 | Mchann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |

\* cited by examiner

POWER-LINE COMMUNICATIONS WITH COMMUNICATION CHANNEL TO AND/OR FROM ENDPOINT CIRCUITS WITH AUTHENTICATION METHODOLOGY

RELATED PATENT DOCUMENT

This patent document is a continuation under 35 U.S.C. §120 of U.S. Pat. No. 9,009,467 issued on Apr. 14, 2015; which is further a continuation of U.S. patent application Ser. No. 12/894,438 filed on Sep. 30, 2010 (now abandoned), to each of which priority is claimed.

BACKGROUND

This specification relates to data communications.

Service providers utilize distributed networks to provide services to customers over large geographic areas. For example, communications companies utilize a distributed communications network to provide communications services to customers. Similarly, power companies utilize a network of power lines and meters to provide power to customers throughout a geographic region and receive data back about the power usage.

These service providers are dependent on proper operation of their respective networks to deliver services to the customers and receive data back regarding the services provided. For example, the service provider may want access to daily usage reports to efficiently bill their customers for the resources that are consumed or otherwise utilized by the customers. Therefore, it is important for data specifying resource utilization and other information to be reliably transmitted and/or received at specified intervals.

In power line communication (PLC) networks, endpoints (e.g., meters, load control switches, remote service switches, and other endpoints) in the network can provide updated information (e.g., power consumption information and/or operating status information) to a network management apparatus by transmitting data over power lines. Each endpoint that communicates over a particular PLC network can be implemented to communicate over a different specified channel, such that each endpoint in that PLC network communicates over a different channel. However, endpoints in neighboring PLC networks may communicate over the same or nearby channels. Therefore, it is possible that communications received over a particular channel of a PLC network may actually be communications transmitted by a neighboring endpoint in a neighboring PLC network that were coupled into the PLC network. If these communications are not identified as being from the neighboring endpoint, they might be improperly logged.

SUMMARY

In general, one innovative aspect of the subject matter described in this specification can be embodied in methods that include the actions of receiving a symbol over a particular communications channel; decrypting the symbol using a decryption key that is assigned to a particular endpoint that is assigned the particular communications channel; computing a measure of error for the decrypted symbol; determining whether the measure of error exceeds a threshold error measure; in response to determining that the measure of error exceeds the threshold error measure, identifying the decrypted symbol as a symbol from a different endpoint; and in response to determining that the measure of error does not exceed the threshold error measure: identifying the decrypted symbol as a valid symbol transmitted by the particular endpoint; and logging the valid symbol. Other embodiments of this aspect include corresponding systems, apparatus, and computer programs, configured to perform the actions of the methods, encoded on computer storage devices.

These and other embodiments can each optionally include one or more of the following features. Methods can include the actions of generating, by the particular endpoint, the symbol to include payload data and error correction data; encrypting, by the particular endpoint, the symbol using an encryption key that is assigned to the particular endpoint; and transmitting, by the particular endpoint, the encrypted symbol over the particular communications channel.

Generating the symbol can include inserting an error correcting code into the payload data; and encrypting the symbol can include encrypting the symbol following insertion of the error correcting code. Receiving a symbol can include receiving a plurality of different symbols over a plurality of different communications channels, each different communications channel being assigned to a different endpoint; and decrypting the symbol can include, for each of the different communications channels, decrypting the symbol using a decryption key that is assigned to the endpoint to which the communications channel is assigned.

Methods can further include the actions of retrieving, for each different endpoint, a different decryption key that is assigned to the different endpoint. Decrypting the symbol can include decrypting the symbol with a symmetric key that has been assigned to the particular endpoint. Computing a measure of error comprises computing a bit error rate for the decrypted symbol; and determining whether the measure of error exceeds a threshold error measure comprises determining whether the bit error rate exceeds a threshold bit error rate.

Receiving a symbol from a particular endpoint can include receiving the symbol from a particular meter over a particular channel of a power line communications network. Decrypting the symbol can include decrypting the symbol with a decryption key that is assigned to the particular meter.

Particular embodiments of the subject matter described in this specification can be implemented so as to realize one or more of the following advantages. The source of communications (i.e., a transmitter identity) can be determined and/or confirmed based on the decryption key that properly decrypts the data. The source of the communications can be determined independent of any other source identifying data being included in the communications. A decryption key used to decrypt communications can be discovered without knowledge of the contents of the communications. Interfering signals can be ignored by determining that the signals were not transmitted by an expected source and discarding these interfering signals.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A source of data received over a communications network is determined based on a decryption key that is used to decrypt the data and/or a measure of error for the decrypted data. For example, each transmitter in a communications network can be assigned a unique pair of encryption/decryption keys (or a shared key). The transmitters each transmit data that are encrypted using their respective unique encryption key, and the receivers can be provided with the unique decryption keys that have been assigned to the respective transmitters.

The encrypted data includes error correction data, such as forward error correction data that was inserted prior to encryption of the data. Therefore the error correction data will be recovered when the data is decrypted, such that a number of bit errors can be determined for the decrypted data. The quantity of bit errors that are detected in data that were decrypted using the appropriate decryption key (i.e., the decryption key that is paired with the encryption key that was used to encrypt the data) will be lower than the quantity of bit errors that are detected in data that were decrypted with another decryption key. Thus, the source of the communications can be determined to be the transmitter that has been assigned the decryption key that provides the lowest quantity of bit errors.

The description that follows discusses determining whether a particular endpoint in a PLC network transmitted a particular symbol that was received over a particular channel. The description that follows is also applicable to identifying and/or authenticating a source of other data received over a communications channel.

Figure 1:
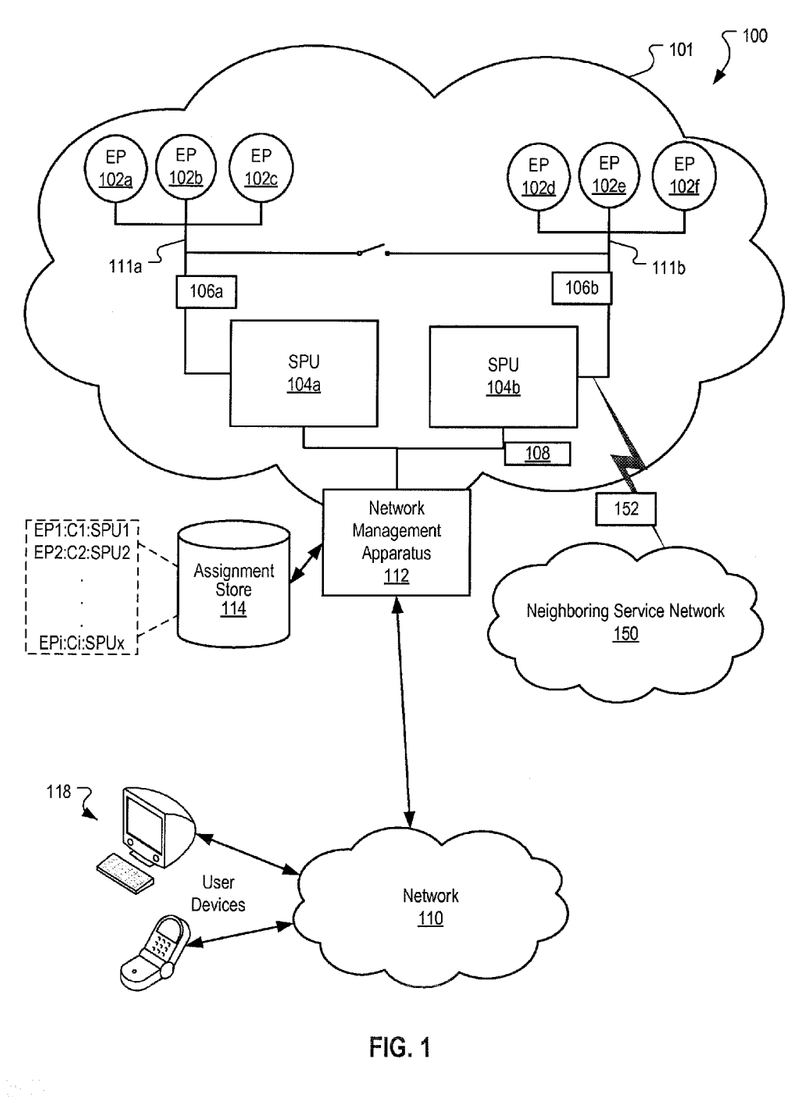
FIG. 1 is a block diagram of an example network environment in which endpoints transmit data.

FIG. 1 is a block diagram of an example network environment 100 in which end points 102 transmit data. The network environment 100 includes a service network 101 in which a plurality of end points 102a-102f are coupled (e.g., communicatively coupled) to substation processing units 104a, 104b. The end points 102 can be any device capable of transmitting data in the network environment 100. For example, the end points 102 can be meters in a utility network, computing devices, television set top terminals or telephones that transmit data in the service network 101. The description that follows refers to the end points 102 as power meters in a power distribution network. However, the description that follows is applicable to other types of end points 102 in utility networks or other networks. For example, the description that follows is applicable to gas meters and water meters that are respectively installed in gas and water distribution networks.

The end points 102 can be implemented to monitor and report various operating characteristics of the service network 101. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The end points 102 report the operating characteristics of the network 101 over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be implemented in power line communication networks that dynamically allocate available bandwidth according to an orthogonal frequency division multiple access (OFDMA) spectrum allocation technique or another channel allocation technique. (e.g., Time Division Multiple Access, Code Division Multiple Access, and other Frequency Division Multiple Access techniques).

When the end points 102 are implemented as power meters in a power distribution network, the power meters transmit reporting data that specify updated meter information that can include measures of total power consumption, power consumption over a specified period of time, peak power consumption, instantaneous voltage, peak voltage, minimum voltage and other measures related to power consumption and power management (e.g., load information). Each of the power meters can also transmit status data that specify a status of the power meter (e.g., operating in a normal operating mode, emergency power mode, or another state such as a recovery state following a power outage).

In some implementations, symbols 106 (i.e., one or more bits) including the reporting and/or the status data are continuously or intermittently transmitted over a specified unit interval. A unit interval is a period of time over which a particular symbol is transmitted. A unit interval for each symbol transmitted by a power meter can be less than or equal to the time interval (i.e., 1/update rate) at which updated meter information is required to be provided.

For example, assume that a particular meter is required to provide updated meter information every 20 minutes (i.e., the specified update rate for the meter). In this example, a meter can transmit a symbol representing a first set of updated meter information for twenty minutes, and then transmit another symbol representing a next set of updated meter information for a subsequent twenty minutes. The update rate and/or unit interval for a meter can be specified by a network administrator based, for example, on types and amounts of updated meter information that are being received from the meter, preferences of a customer (e.g., a power company) to whom the data is being provided, and/or channel characteristics of the channel over which the data is being transmitted. An update rate of 20 minutes is used for purposes of example, but other update rates (e.g., 1 minute, 5 minutes, 10 minutes, 1 hour, or 1 day) can be used.

In FIG. 1, end points 102a-102c and 102d-102f transmit symbols 106a, 106b over communications channels 111a and 111b respectively to substation processing units 104a, 104b, respectively. A substation processing unit (SPU) 104 is a data processing apparatus that receives communications from end points 102 to manage the service network 101 or for transmission to a network management apparatus 112 and/or through a data network 110. For example, a SPU 104 can include a receiver that receives symbols 106 from end points 102 and logs data from the symbols 106. A SPU 104 can also take action based on the data received from the end points 102 and transmit the symbols 106 to a network management apparatus 112 that manages the service network 101. SPUs 104 can transmit the individual symbols 106 or generate a consolidated packet 108 that includes data from multiple symbols 106 received from the end points 102.

In some implementations, a single SPU 104 can be configured to receive symbols 106 from thousands of end points 102 and transmit the symbols 106 to a network management apparatus 112. A network management apparatus 112 is a data processing apparatus that processes communications that are received from SPUs 104 and/or controls aspects of the service network based, at least in part, on information extracted from the symbols 106 that were received from the SPUs 104a, 104b.

For example, in a PLC network, the network management apparatus 112 can receive data indicating that power usage is significantly higher in a particular portion of a power network than in other portions of the power network. Based on this data, the network management apparatus 112 can allocate additional resources to that particular portion of the network (i.e., load balance) or provide data specifying that there is increased power usage in the particular portion of the power network.

In some implementations, the network management apparatus 112 provides data to user devices 118 that can be accessed, for example, by the network operator, maintenance personnel and/or customers. For example, data identifying the increased power usage described above can be provided to a user device 118 accessible by the network operator, who can, in turn, determine an appropriate action regarding the increased usage. Additionally, data identifying a time-of-use measure and/or a peak demand measure can also be provided to the user device 118. Similarly, if there has been a power outage, the network management apparatus 112 can provide data to user devices 118 that are accessible by customers to provide information regarding the existence of the outage and potentially provide information estimating a duration of the outage.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only two SPUs 104a, 104b and one network management apparatus 112 are shown, the service network 101 can include many different SPUs 104 that can each communicate with thousands of end points 102 and many different network management apparatus 112 that can each communicate with multiple SPUs 104.

Symbols 106 from a particular end point 102 (e.g., 102a) may be transmitted over one of thousands of communications channels in a PLC system. For example, each endpoint 102 can be assigned a particular channel using OFDMA or another channel allocation technique. Channel assignments for the endpoints 102 that communicate with particular SPUs can be stored, for example, in an assignment data store 114 that is accessible to the network management apparatus 112 and/or the SPUs 104a, 104b. For example, as illustrated in FIG. 1, the assignment store can maintain an index of endpoints (e.g., EP1-EPi), the channel that the endpoint has been assigned (C1-Ci), and the SPU (e.g., SPU1-SPUx) that is responsible for receiving symbols transmitted by the respective endpoints.

A SPU 104 can use the channel assignments, for example, to determine which endpoint 102 transmitted symbols 106 that are received over each of the communications channels. In turn, the SPU 104 can log (i.e., store) the symbols 106 based on the identity of the endpoint 102 that transmitted the symbol 106. For example, using the channel assignments, the SPU 104b can determine that the endpoint 102d has been assigned channel 1. In this example, when the SPU 104b receives symbol 106b over channel 1, the SPU 104b can log the symbol 106b in memory as a symbol for endpoint 102d.

Generally, the channel over which a symbol 106 is received is a reliable indicator of the endpoint 102 from which the symbol 106 was received. For example, when the service network 101 is operating in a normal operating state, transmissions by a particular endpoint 102 over a particular channel will generally have magnitudes that are higher than any interfering signals present in the particular channel. Therefore, symbols 106 that are received over the particular channel are likely to be the symbols that were transmitted by the particular endpoint 102 that has been assigned the particular channel.

However, as characteristics of the service network 101 change, the signal characteristics (e.g., signal amplitude and signal to noise ratios) of symbols 106 and other data transmitted over the channel also change. For example, when a capacitor bank is activated, the amplitudes of symbols received at one or more of the SPUs 104a, 104b and/or one or more of the end points 102a-102f can fall because the impedance of the capacitor bank can be lower than that of the SPUs 104a, 104b and/or the end points 102a-102f, respectively. Therefore, more current flows to the capacitor bank than the SPUs 104a, 104b and/or the end points 102a-102f. Accordingly, the amplitude of symbols 106 received at the SPUs 104a, 104b can fall when the capacitor bank is activated.

Transmission characteristics of the individual channels can also vary over time, for example, due to changes in the environment in which the service network 101 is located (e.g., increased noise from noise sources near components of the network or interfering signals from neighboring networks). As the transmission characteristics of the service network 101 change the amplitude of the symbols 106 being received by a SPU 104 over one or more channels can fall, such that interfering signals in the channel may have higher amplitudes than the symbols 106 that are being transmitted by the endpoint that has been assigned to the channel. When the amplitudes of interfering signals (e.g., 152) on a particular channel are higher than the amplitude of the symbols (e.g., 106b) being transmitted by a particular endpoint (e.g., 102d) that has been assigned to the channel, the SPU (e.g., 104b) may log the interfering signals as symbols 106 that were received from the particular endpoint.

For example, a power outage in the service network 101 may cause the amplitudes of the symbols 106b transmitted by the endpoint 102d to approach zero. As the amplitude of symbols 106b fall, the amplitude of interfering data 152 that are electrically coupled into the particular channel from a neighboring service network 150 may exceed the amplitude of the symbols 106b. Therefore, the SPU 104b may log the interfering data 152 as a symbol 106b from endpoint 102d unless the SPU 104 can determine that the interfering data 152 was not transmitted by the endpoint 102d.

Symbols 106 transmitted over a power line communication network are generally limited in the number of bits that are transmitted during a unit interval. Therefore, the symbols 106 may not include data that identify a source of the symbol. Accordingly, it can be difficult to determine whether data received at a SPU 104 was transmitted by the particular endpoint 102 that is assigned to the particular channel over which the data were received.

Instead of (or in addition to) inserting data into a symbol that identifies the source of a symbol (e.g., the endpoint that transmitted the symbol), encryption techniques can be used to identify a source of a particular symbol. In some implementations, each of the endpoints 102 is assigned a unique encryption key that the endpoint 102 uses to encrypt symbols 106 that are transmitted by the endpoint 102, and a unique decryption key that is used to decrypt symbols 106 that were transmitted by the endpoint 102. The unique encryption and decryption keys can be assigned, for example by the SPU 104 and/or the network management apparatus 112. In some implementations, each of the endpoints 102 is assigned Advanced Encryption Standard ("AES") encryption and decryption keys. The AES encryption technique is provided for purposes of example, but other encryption techniques can also be used. The encryption keys for each of the endpoints can be stored, for example, in the assignment data store 114 in a manner similar to that used to store the channel assignments for the endpoints.

When symbols 106 transmitted by different endpoints respectively require a different decryption key to recover the data of the respective symbols, the particular endpoint that transmitted a particular symbol can be identified based on the decryption key that was used to recover the data from the symbol. For example, different unique decryption keys can be required to properly decrypt symbols 106 that are transmitted by each of the endpoints 102a-102f. In this example, when a symbol is properly decrypted (e.g., accurately recovered with less than a threshold quantity of errors) using the unique decryption key for endpoint 102b, the source of the symbol 106 can be identified as endpoint 102b. Similarly, when a particular symbol is properly decrypted using the unique decryption key that has been assigned to endpoint 102d, the source of that particular symbol can be identified as 102d.

When the original data that were included in unencrypted symbols are available to the SPU 104 (or another data processing apparatus) that decrypts the symbols using a particular decryption key, the SPU 104 can compare the decrypted symbols to the original data to determine whether the symbols were properly decrypted using the particular decryption key. For example, the SPU 104 can perform a bit by bit or word by word analysis of the data to determine whether the decrypted symbols match the original data.

When the original data are not available to the SPU 104 that decrypts the symbols using the particular decryption key, a data encoding technique, such as a forward error correction technique (e.g., Reed-Solomon coding), can be used to determine whether the decrypted symbols match the original data. As described in more detail below, prior to encrypting the original data, the endpoint 102 can insert forward error correction data into the symbols. This forward error correction data can be used post-decryption by the SPU 104 to determine an error measure (e.g., a bit error rate or quantity of bit errors) for the decrypted symbols.

The SPU 104 can use the error measure to determine whether to log the symbols as valid symbols and/or which endpoint transmitted the symbols. For example, if the SPU 104 determines that the error measure for the symbols does not exceed a threshold error measure, the SPU 104 can determine that the symbols have been properly decrypted using the particular decryption key. Therefore, the SPU 104 can determine that the symbols were transmitted by the endpoint 102 to which the particular decryption key was assigned, and log the symbols as valid symbols for that endpoint 102. If the SPU 104 determines that the error measure for the symbols is above a threshold error threshold, the SPU 104 can determine that the symbols were not properly decrypted and ignore and/or discard the symbols.

Figure 2:
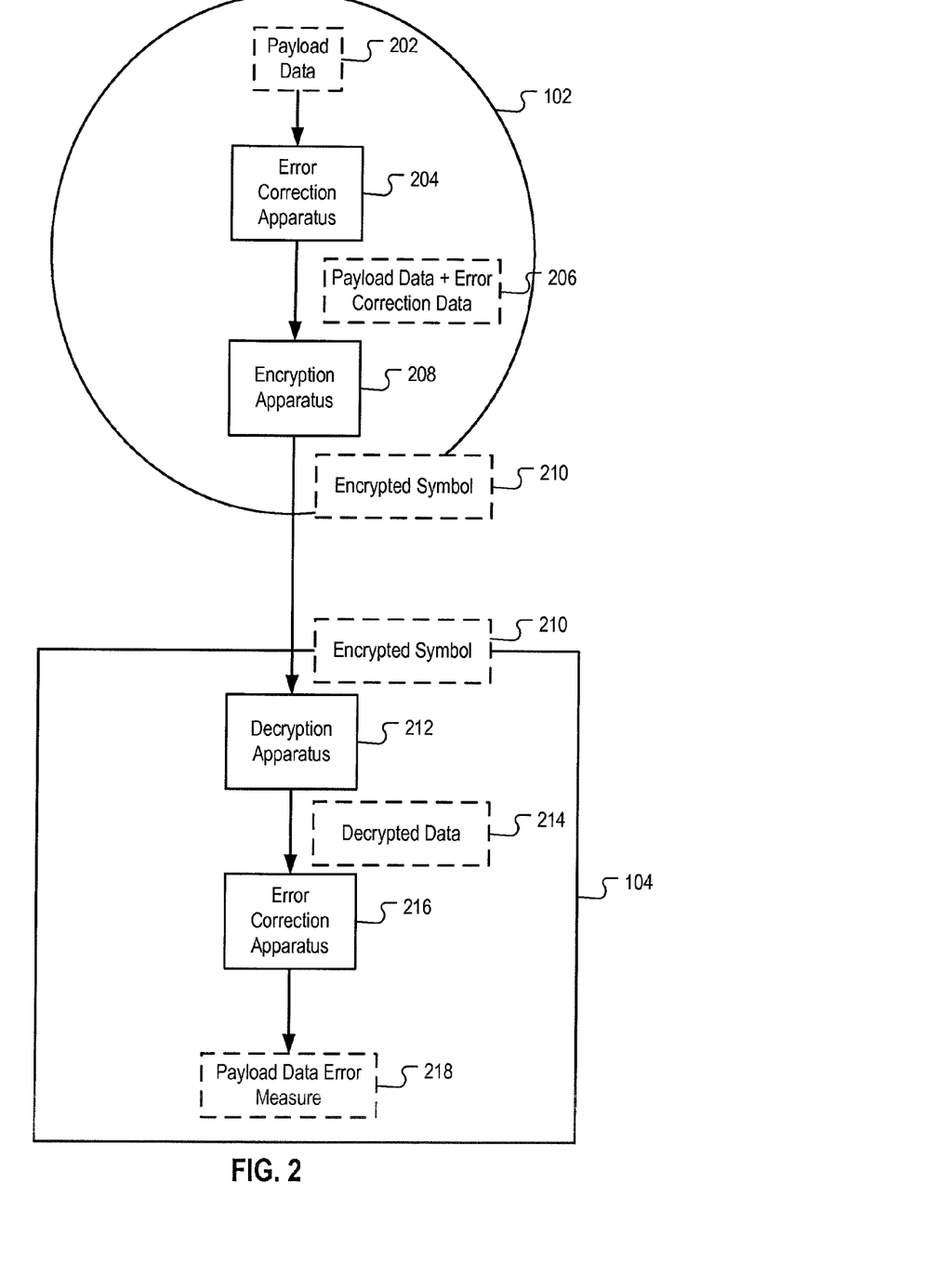
FIG. 2 is a block diagram that illustrates an example process flow for authenticating the source of data communications.

FIG. 2 is a block diagram that illustrates an example process flow 200 for authenticating the source of data communications. The process flow begins with an endpoint 102 generating or receiving payload data 202 to be transmitted through a communications network. The payload data can be, for example, reporting data, status data, and/or other data to be transmitted by the endpoint 102.

The payload data 202 is input to an error correction apparatus 204. The error correction apparatus 204 is a data processing apparatus that is configured to create an encoded symbol 206 that includes the payload data 202 and error correction data. For example, the error correction apparatus can include one or more processors that are configured to encode the payload data with redundant data that can be used to facilitate a forward error correction technique. The error correction apparatus 204 outputs the encoded symbol 206 that includes the payload data and the error correction data.

The encoded symbol 206 is then input to an encryption apparatus 208. The encryption apparatus 208 is a data processing apparatus that is configured to encrypt the encoded symbol 206. For example, the encryption apparatus 208 can include one or more processors that are configured to encrypt the encoded symbol 206 using an AES encryption key that has been uniquely assigned to the endpoint 102. The encryption apparatus 208 can also utilize other types of encryption algorithms that have been used to generate encryption keys that have been assigned to the endpoint 102. The encryption apparatus 208 can obtain the encryption key that has been assigned to the endpoint 102, for example, from a data store in which the encryption keys are indexed according to the endpoint to which each respective encryption key has been assigned. The encryption apparatus 208 outputs an encrypted symbol 210 for transmission through the communications network.

The encrypted symbol is received by a SPU 104 that includes a decryption apparatus 212. The decryption apparatus 212 is a data processing apparatus that is configured to decrypt encrypted symbols 210. For example, the decryption apparatus 212 can include one or more processors that are configured to decrypt the encrypted symbol 210 using an AES decryption key that has been uniquely assigned to the endpoint 102. The decryption apparatus 212 can also utilize other types of decryption techniques that have been used to generate decryption keys that have been assigned to the endpoint 102. The decryption apparatus 212 can obtain the decryption key for the endpoint, for example, from a data store in which the decryption keys are indexed according to the endpoint to which each respective decryption key has been assigned. The decryption apparatus outputs decrypted data 214.

The decrypted data 214 is provided as input to an error correction apparatus 216. The error correction apparatus 216 is a data processing apparatus that is configured to perform an error correction technique using the decrypted data 214. For example, the error correction apparatus 216 can include one or more processors that are configured to recover the payload data 202 from the decrypted data. The error correction apparatus 216 can also be configured to compute a measure of error for the decrypted data 214. For example, the error correction apparatus can compute a quantity of bit errors, a bit error rate and/or other measures of error using the decrypted data and the selected error correction technique.

The error correction apparatus 216 outputs a payload data error measure 218 (e.g., a bit error rate) and/or recovered payload data. The SPU 104 takes action based on the magnitude of the payload error measure, as described in more detail with reference to FIG. 3. For example, the SPU 104 can ignore and/or discard recovered payload data when the payload error measure 218 exceeds a pre-specified error threshold, and log the recovered payload data as valid data when the payload error measure 218 is does not exceed the pre-specified error threshold.

Figure 3:
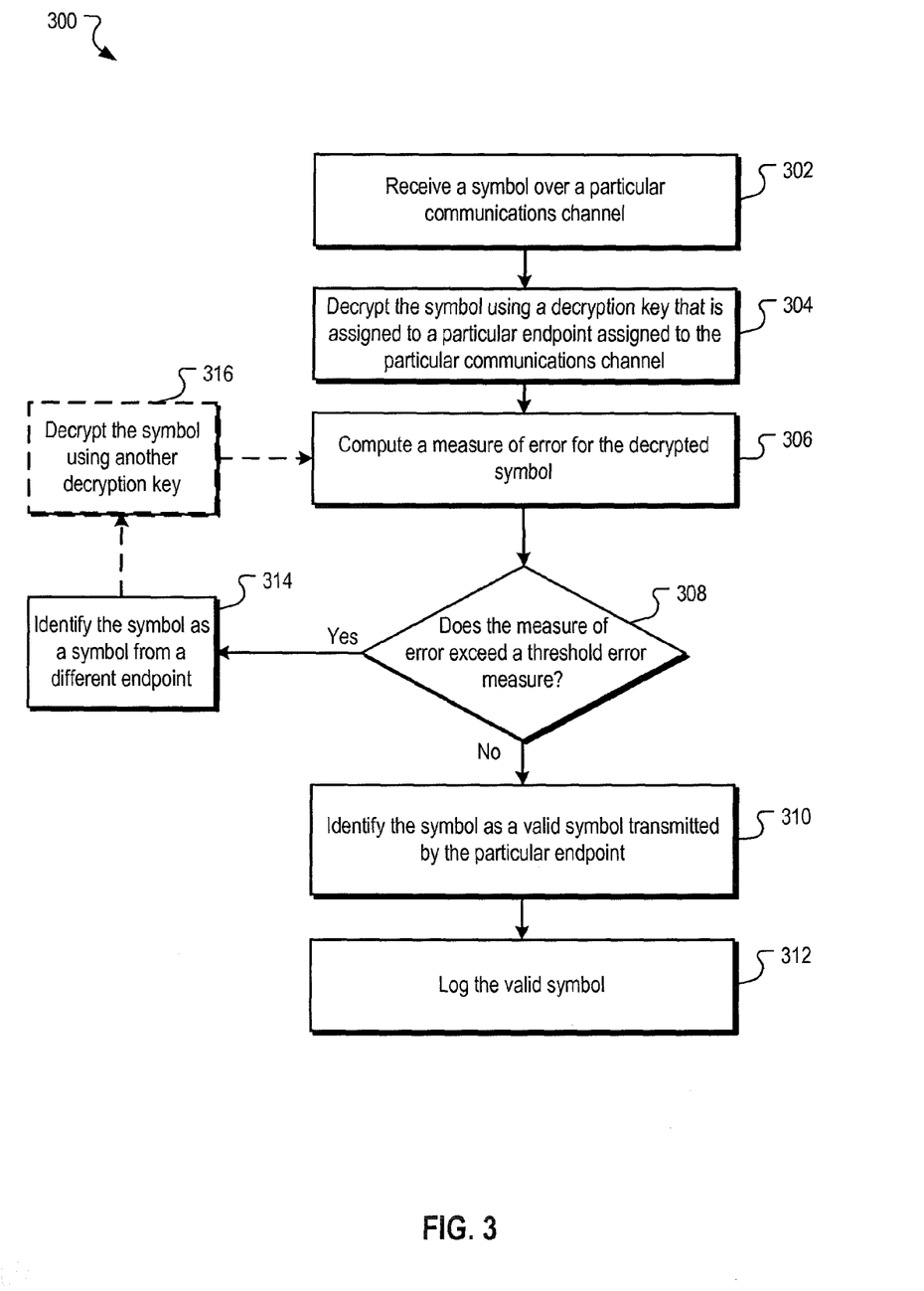
FIG. 3 is a flow chart of an example process for determining the source of received communications.

FIG. 3 is a flow chart of an example process 300 for determining the source of received communications. The process 300 is a process by which a symbol is received over a particular communications channel. The symbol is decrypted using a decryption key that is assigned to a particular endpoint assigned to the particular communications channel. A measure of error is computed for the decrypted symbol, and a determination is made whether the measure of error exceeds a threshold error. If the measure error exceeds the threshold error, the symbol is identified as a symbol from a different endpoint. If the measure of error does not exceed the error threshold error, the symbol is identified as a valid symbol transmitted by the particular endpoint, and logged as such.

The process 300 can be implemented, for example, by the SPU 104 and/or network management apparatus 112 of FIG. 1. In some implementations, one or more processors are configured to perform actions of the process 300. In other implementations, a computer readable medium can include instructions that when executed by a computer cause the computer to perform actions of the process 300. The process 300 is described with reference to symbols that are received over channels of a PLC network, but the process 300 can also be implemented in other communications environments.

A symbol is received over a particular communications channel (302). In some implementations, the particular communications channel is a particular channel in a PLC network over which a particular endpoint communicates. For example, as described with reference to FIG. 1, channels of a PLC network can be dynamically allocated (assigned) to endpoints using ODFM or another channel allocation technique. The channel assignments (e.g., a mapping and/or table of channels that are assigned to respective endpoints) can be stored in a data store and/or provided to apparatus, such as endpoints and/or network management apparatus, that are implemented in the network. The channel assignments can also be stored in high-speed memory (e.g., Random Access Memory) that is accessible to apparatus that are implemented in the PLC network.

In some implementations, many different symbols are received over many different communications channels. For example, many different endpoints that are each respectively assigned different communications channels can be received simultaneously (or within a threshold time period) by an endpoint. In these implementations, the particular endpoint that is assigned to each of the particular channels over which symbols are being received can be determined using the stored channel assignments. For example, the stored channel assignments may specify that channel 1 is assigned to endpoint 1 while channel 2 is assigned to endpoint 2, such that if communications are received simultaneously over channels 1 and 2 the communications are presumed to be from endpoints 1 and 2, respectively.

The symbol is decrypted using a decryption key that is assigned to the particular endpoint for the particular communications channel (304). As described above, each individual endpoint can be assigned unique encryption/decryption keys. Therefore, the unique decryption key that is assigned to a particular endpoint must be used in order to properly decrypt symbols that are transmitted by the particular endpoint. The encryption/decryption keys can be symmetric keys that are used, for example, in AES encryption techniques or non-symmetric keys that are used for other encryption techniques.

In some implementations, the encryption/decryption keys that have been assigned to each of the endpoints can be stored in a decryption table that is stored, for example, with the channel assignments and/or indexed according to the communications channel to which the keys are assigned. For example, the decryption table can specify that symbols from endpoint 1 (i.e., symbols received over channel 1) must be decrypted using decryption key 1, while symbols received from endpoint 1 (i.e., symbols received over channel 2) must be decrypted using decryption key 2. Thus, when symbols are received over channel 1, decryption key 1 can be selected and used to decrypt the symbols, while decryption key 2 can be selected and used to decrypt symbols that are received over channel 2.

When multiple symbols are received over multiple channels at substantially the same time, the decryption keys that are assigned to each respective channel (and/or endpoint) can be retrieved and used to decrypt the symbols that are received over the respective channels. For example, each SPU can include multiple decryption apparatus that are each respectively assigned to one or more channels. Each of these decryption apparatus can independently retrieve, access, or otherwise obtain the unique decryption key that has been assigned to the endpoint assigned to the channel. Thus, each of the decryption apparatus can simultaneously decrypt symbols received over their respective channels using the appropriate decryption key (i.e., the key that was assigned to the endpoint and/or channel).

A measure of error is computed for the decrypted symbol (306). In some implementations, the measure of error is computed for the decrypted symbol as part of an error correction technique that is performed using the decrypted symbol. For example, a forward error correction technique (e.g., Reed-Solomon) can be used to perform an error check (e.g., whether the data is valid data), correct bit errors, and/or compute measures of error for decrypted symbols (e.g., based on a quantity of corrected bits relative to a total quantity of bits). The measures of error can include, for example, a total quantity of detected bit errors and/or a bit error rate.

A determination is made whether the measure of error exceeds a threshold error measure (308). This determination is referred to as an error check. In some implementations, the decrypted symbol is considered to pass the error check, for example, when the bit error rate (or another measure of error) does not exceed a threshold bit error rate (or another threshold error rate). The decrypted symbol does not pass the error check when the bit error rate (or another measure of error) exceeds the threshold bit error rate (or another threshold error rate).

The threshold error rate can be selected for example to ensure that the decrypted symbol is a valid symbol (i.e., accurately represents the original payload data in the symbol) with at least a threshold likelihood. For example, the threshold error rate can be selected as a bit error rate (or another measure of error) at which there is at least a 75% likelihood that the decrypted symbol is valid.

In response to determining that the measure of error does not exceed the threshold error measure, the symbol is identified as a valid symbol that was transmitted by the particular endpoint that is assigned to the channel (310). In some implementations, symbols having an error rate that does not exceed the threshold error rate are determined to have been properly decrypted using the selected decryption key (i.e., the decryption key assigned to the particular endpoint). Therefore, when each endpoint is assigned unique decryption keys, symbols that are properly decrypted (i.e., have an error rate that does not exceed the threshold error rate) using the decryption key for a particular endpoint, the symbols can be identified as symbols that were transmitted by that particular endpoint because if the symbols are decrypted using a different decryption key, the error rates for the symbols will generally be above the threshold error rate.

In response to determining that the symbol is a valid symbol, the valid symbol is logged (e.g., stored and/or indexed) as a valid symbol that was received from the particular endpoint (312). The valid symbol can be logged, for example, to a data store that stores valid symbols in association with (i.e., at memory locations assigned to or stored with a reference to) the particular endpoint from which the symbol was received.

In response to determining that the measure of error exceeds the threshold error measure, the symbol is identified as a symbol from a different endpoint (314). When the symbol is not properly decrypted (i.e., has an error rate that exceeds the threshold error rate) using the decryption key of the endpoint that is assigned the particular channel, it is likely that the symbol was not transmitted by the particular endpoint. Therefore, the symbol can be identified as not having been transmitted by the particular endpoint, but rather having been transmitted by an endpoint (or another apparatus) other than the particular endpoint. In some implementations, the symbol can be ignored and/or discarded in response to determining that the measure of error exceeds the threshold error measure.

Although a symbol may not have been properly decrypted using the selected decryption key, the symbol may still include valid data. For example, the symbol may have been transmitted by another endpoint (e.g., another meter) that belongs to a same communications network as the particular endpoint. In this example, the received symbol can continue to be processed to determine the identity of the endpoint that transmitted the symbol and/or to log the data.

In some implementations, the received symbol can be decrypted using another decryption key (316). For example, using the decryption key that is assigned to another endpoint that communicates over an adjacent channel (or any other channel) can be selected (e.g., using the decryption table) to decrypt the symbol. In these implementations, once the symbol has been decrypted using the other decryption key, a measure of error can again be computed for the decrypted symbol (306), and a determination can be made whether the measure of error exceeds the threshold error (308).

The decryption (316), error measure computation (306), and determination of whether the measure of error exceeds the threshold error measure (308) can be iteratively performed until a decryption key that properly decrypts the symbol is identified, or until all available decryption keys have been used to decrypt the symbol. Once a decryption key has been identified as a decryption key that properly decrypts the symbol, the symbol can be logged as a valid symbol for the endpoint to which the identified decryption key was assigned.

In some implementations, the iterative process of decrypting symbols and analyzing the error rate associated with the decrypted symbol can also be used to discover other encoded data without first knowing the content or source of the encoded data. For example, if the location of the error correction bits is known for a particular set of data, the data can be iteratively decrypted using different decryption keys, and error checks can be performed for each instance of the decrypted data. The decryption key that produces decrypted data that passes the error check (e.g., has an error rate that does not exceed the threshold error rate) can be selected as the decryption key required to decrypt the symbols. In these implementations, permutations of different decryption keys and different error checking techniques can be utilized to identify the decryption key/error checking pair that produces the lowest error rate.

Figure 4:
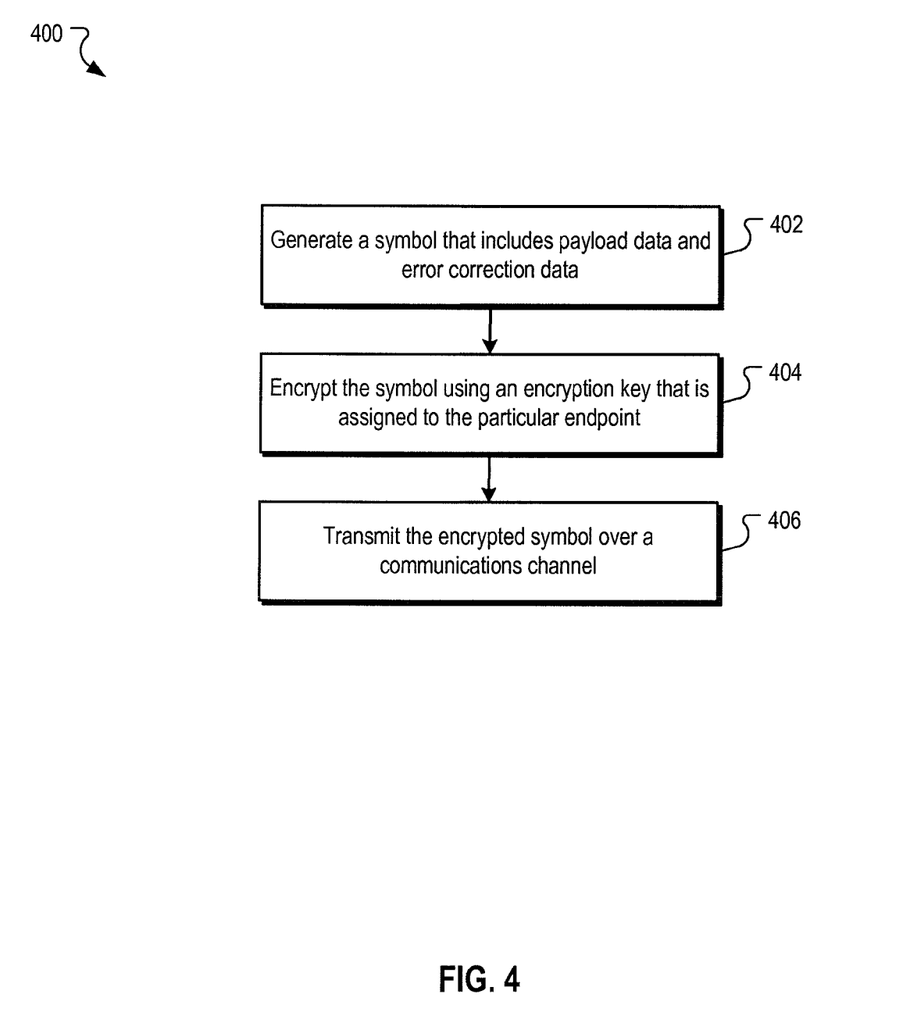
FIG. 4 is a flow chart of an example process for generating encrypted data with which the source of the data can be determined based on the decryption key that properly decrypts the data.

FIG. 4 is a flow chart of an example process 400 for generating encrypted data with which the source of the data can be determined based on the decryption key that properly decrypts the data. The process 400 is a process by which a symbol that includes payload data and error correction data is generated. The symbol is encrypted using an encryption key that is uniquely assigned to the particular endpoint, and transmitted over a communications channel. The source of the encrypted symbol can be determined, for example, in a manner similar to that described with reference to FIG. 3 independent of whether the symbol includes payload data that identify the source of the symbol.

The process 400 can be implemented, for example, by the endpoints 102, the SPU 104, and/or network management apparatus 112 of FIG. 1. In some implementations, one or more processors are configured to perform actions of the process 400. In other implementations, a computer readable medium can include instructions that when executed by a computer cause the computer to perform actions of the process 400. The process 400 is described with reference to symbols that are received over channels of a PLC network, but the process 400 can also be implemented in other communications environments.

A symbol that includes payload data and error correction data is generated (402). The symbol can be generated, for example, by inserting redundant bits of data into the symbol, where the redundant bits of data can be used to correct errors that may occur during transmission. For example, forward error correction techniques can be used to encode the payload data.

The symbol is encrypted using an encryption key that is assigned to the particular endpoint (404). In some implementations, the symbol is encrypted following insertion of the error correction data. The encryption key that is assigned to the particular endpoint can be a symmetrical encryption key for an AES encryption technique or another encryption key used by another encryption technique. The encryption key can be obtained, for example, from an encryption table that lists encryption keys and endpoints to which the encryption keys have been assigned.

The encrypted symbol is transmitted over a communications channel (406). In some implementations, the encrypted symbol is transmitted over a particular communications channel that has been assigned to an apparatus that is transmitting the encrypted symbol. For example, the particular channel can be a channel of a PLC network over which a particular endpoint has been authorized to transmit symbols. The channel over which the encrypted symbol is transmitted can be selected, for example, based on a set of channel assignments that specify particular endpoints and particular channels that have been respectively allocated to the particular endpoints. Symbols from each different apparatus can be transmitted over a different channel.

Figure 5:
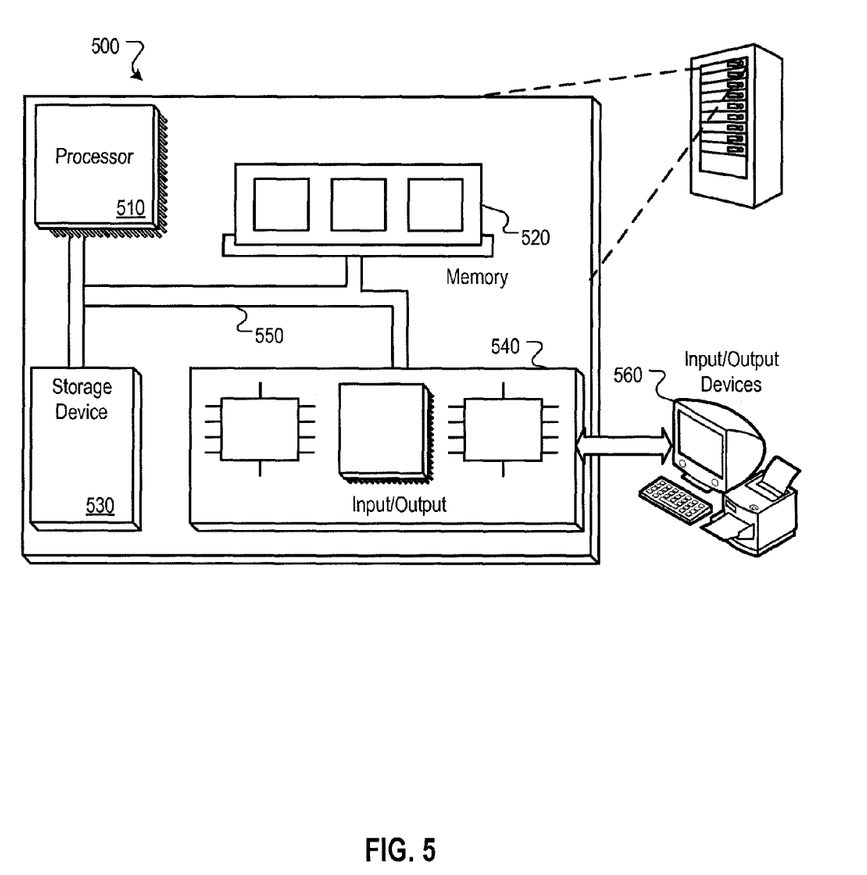
FIG. 5 is a block diagram of an example system that can be used to facilitate verification of a communications source.

FIG. 5 is a block diagram of an example system 500 that can be used to facilitate verification of a communications source, as described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface device, such as an Ethernet card, a serial communication device (e.g., an RS-232 port), and/or a wireless interface device (e.g., an 802.11 card). In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit) The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. For use in a power-line communication system, a method performed by data processing electronic circuitry, the method comprising:
   receiving a plurality of symbols from a plurality of endpoint circuits and over a plurality of communications channels on power lines in the power-line communication system;
   obtaining respective and different decryption keys from an encryption table that lists the respective and different decryption keys and corresponding assignments to the plurality of endpoint circuits;
   decrypting a first symbol of the plurality of symbols using a first decryption key that is assigned to a first endpoint circuit;
   computing, from the first symbol as decrypted using the first decryption key, a first measure of error that includes a first bit error rate;
   decrypting the first symbol using a second decryption key that is assigned to a second endpoint circuit;
   computing, from the first symbol as decrypted using the second decryption key, a second measure of error that includes a second bit error rate;
   comparing the first and second bit error rates to a threshold error measure;
   identifying, in response to the first bit error rate exceeding the threshold error measure, the first symbol as a valid symbol from the first endpoint circuit; and
   logging the first symbol as valid relative to the first endpoint circuit.

2. The method of claim 1, further comprising:
   decrypting, for each of the plurality of symbols, using respective and different decryption keys for each of the plurality of endpoint circuits.

3. The method of claim 2, further comprising:
   computing, for each of the plurality of symbols and each of the different decryption keys, bit error rates; and
   logging, in response to the bit error rates, at least some of the plurality of symbols relative to a corresponding endpoint circuit of the plurality of endpoint circuits.

4. The method of claim 2, wherein the decryption keys for each of the plurality of endpoint circuits are symmetric encryption keys.

5. The method of claim 2, further comprising: discarding at least one symbol of the plurality of symbols in response to a bit error rate for the at least one symbol being below the threshold error measure.

6. The method of claim 1, wherein computing, from the first symbol as decrypted using the first decryption key, the first measure of error includes using forward error correction data that is present in the first symbol.

7. For use in a power-line communication system, a non-transitory computer readable storage medium encoded with computer instructions that, when executed by a computer, cause the computer to perform operations comprising:
   receiving a plurality of symbols from a plurality of endpoint circuits and over a plurality of communications channels on power lines in the power-line communication system;
   obtaining respective and different decryption keys from an encryption table that lists the respective and different decryption keys and corresponding assignments to the plurality of endpoint circuits;
   decrypting a first symbol of the plurality of symbols using a first decryption key that is assigned to a first endpoint circuit;
   computing, from the first symbol as decrypted using the first decryption key, a first measure of error that includes a first bit error rate;
   decrypting the first symbol using a second decryption key that is assigned to a second endpoint circuit;
   computing, from the first symbol as decrypted using the second decryption key, a second measure of error that includes a second bit error rate;
   comparing the first and second bit error rates to a threshold error measure;
   identifying, in response to the first bit error rate exceeding the threshold error measure, the first symbol as a valid symbol from the first endpoint circuit; and
   logging the first symbol as valid relative to the first endpoint circuit.

8. A power-line communication system comprising:
a power-distribution processing unit, including a circuit, configured to couple to a set of endpoints via power lines, the processing unit including one or more processors configured to interact with the set of endpoints and further configured to:
receive a plurality of symbols from a plurality of endpoint circuits and over a plurality of communications channels on power lines in the power-line communication system;
obtain respective and different decryption keys from an encryption table that lists the respective and different decryption keys and corresponding assignments to the plurality of endpoint circuits;
decrypt a first symbol of the plurality of symbols using a first decryption key that is assigned to a first endpoint circuit;
compute, from the first symbol as decrypted using the first decryption key, a first measure of error that includes a first bit error rate;
decrypt the first symbol using a second decryption key that is assigned to a second endpoint circuit;
compute, from the first symbol as decrypted using the second decryption key, a second measure of error that includes a second bit error rate;
compare the first and second bit error rates to a threshold error measure;
identify, in response to the first bit error rate exceeding the threshold error measure, the first symbol as a valid symbol from the first endpoint circuit; and
log the first symbol as valid relative to the first endpoint circuit.

9. The system of claim 8, wherein the power-distribution processing unit is further configured to:
decrypt, for each of the plurality of symbols, using respective and different decryption keys for each of the plurality of endpoint circuits.

10. The system of claim 9, wherein the power-distribution processing unit is further configured to:
compute, for each of the plurality of symbols and each of the different decryption keys, bit error rates; and
log, in response to the bit error rates, at least some of the plurality of symbols relative to a corresponding endpoint circuit of the plurality of endpoint circuits.

11. The system of claim 9, wherein the decryption keys for each of the plurality of endpoint circuits are symmetric encryption keys.

12. The system of claim 9, wherein the power-distribution processing unit is further configured to: discard at least one symbol of the plurality of symbols in response to a bit error rate for the at least one symbol being below the threshold error measure.

13. The system of claim 8, wherein being configured to compute the first measure of error includes being configured to use forward error correction data that is present in the first symbol.

14. The method of claim 1, further including identifying, in response to the first bit error rate not exceeding the threshold error measure, the first symbol as being from a different endpoint circuit of the plurality of endpoint circuits.

15. The method of claim 1, further including:
identifying the first endpoint circuit based on the decryption key used to recover data from the signal; and
logging the first symbol as a valid symbol for the first endpoint circuit and based on the identity of the first endpoint circuit.

* * * * *